UNITED STATES PATENT OFFICE.

DEMITRY MINDELEFF, OF WASHINGTON, DISTRICT OF COLUMBIA, ASSIGNOR TO HIMSELF AND THOMSON H. ALEXANDER, OF SAME PLACE.

IMPROVEMENT IN THE PROCESSES OF EXTRACTING METAL FROM ORE.

Specification forming part of Letters Patent No. 152,399, dated June 23, 1874; application filed June 3, 1874.

*To all whom it may concern:*

Be it known that I, DEMITRY MINDELEFF, of Washington city, District of Columbia, have invented certain new and useful Process for Extracting Metals from Ore; and I do hereby declare that the following is a full, clear, and exact description thereof.

The nature of my invention consists in a process for extracting metals from ore by powdering the ore, and subjecting it while under heat to a stream of marsh-gas passing through it, and then treating it with acid. It also consists in separating alloys of gold and silver by converting the sulphate of silver into chloride of silver, and then converting the chloride of silver to a metallic state by means of heat and a stream of marsh-gas, all as hereinafter more fully set forth.

The ore is first crushed or otherwise converted into powder, after which it may be roasted or not, as may be deemed most advantageous. It is then placed in an iron retort, such as is used in the manufacture of illuminating-gas, and a stream of marsh-gas is caused to pass under slight pressure through the filled retort until all the air has been expelled from the retort. When the air has been all expelled the retort is heated to a sufficiently high temperature to reduce the metals in the ore to a metallic state. The entire mass of pulverized ore, having been deprived of all its volatile substances, and the metal being reduced to a metallic state by the means above described, is placed in a vessel, and diluted sulphuric or muriatic acid poured thereon, after which the vessel is closed hermetically. The effect of the acid upon the metallic powder is to dissolve the metals, such as iron, manganum, oxide of chromium, zinc, nickel, cobalt, &c., but to leave intact the copper, silver, and gold.

During this part of my process a great quantity of hydrogen will be liberated, which may be collected in a separate gasometer, or mixed with marsh-gas, and used again in the reduction of metallic ore. The remaining metallic powder is washed and dried and melted into a lump, with a small addition of carbon and flux. If the quantity of silver or gold, or both, in the metallic copper is sufficient to be profitably extracted, the copper is dissolved in sulphuric acid with sufficient heat, and the gold, being separated from the solution of sulphate of copper and sulphate of silver, is melted; then the solution is treated with common table-salt, and the sulphate of silver converted into chloride of silver, which is washed with hot water, and dried by passing it through superheated steam, and when dry it is placed into a retort and heated, when a stream of marsh-gas is passed through it, as above described.

The solution of sulphate of copper is evaporated and dried, and then heated to a temperature sufficient to decompose the sulphate of copper, and convert it partly into oxide of copper and partly into sulphurated copper. This mixture is placed into a retort and treated with a stream of marsh-gas and heat, as described, for the purpose of reducing it to a metallic state when it is melted, as already set forth.

Where copper ore contains a large quantity of sulphur, and it is desired to collect the same, the ore is placed in a retort and subjected to heat, whereby the sulphur is volatilized, and carried into a separate vessel and condensed. The copper ore is then heated, and a stream of marsh-gas passed through it, which converts it into metallic copper, as above described. This process I also employ in separating silver and gold from ores containing iron and other metals in combination with metalloids. I also use this process for separating gold from silver and silver from gold.

Alloys of these metals I treat with sulphuric acid, and, after the separation of the gold from the sulphate of silver, the gold is melted, and then the solution of the sulphate of silver is treated with chloride of sodium, or common table-salt, which will convert the sulphate of silver into chloride of silver, which is then washed with hot water and steam-dried, and a stream of marsh-gas passed through it. This will reduce the chloride of silver into metallic silver, which may then be melted.

The marsh-gas used in this process may be either obtained from the distillation of wood, and from the acetic acid which accompanies this distillation, by a redistillation of the acetic acid with lime; or the gas may be obtained by decomposing the common coal-gas passing through red-hot coke contained in an iron vessel, and converting the olefiant gas which accompanies illuminating-gas into marsh-gas and freed hydrogen. I may also use the marsh-gas which in some places is naturally liberated from the ground.

As the gas which escapes from the retort while heated would infect the surrounding atmosphere with the sulphureted hydrogen or carbon, it is to be received and absorbed in a vessel containing alkali of some kind, the cheapest of which is lime.

The advantages which my process possesses over those now in use are, first, the rapidity with which the metal is purified and separated, and, second, the economy with which the process is practiced.

Having thus fully described my invention, what I claim as new, and desire to secure by Letters Patent, is—

1. In the separation of copper from other metals, first reducing it to the oxide of copper, and then from that to a metallic state by the application of heat and gas.

2. The method herein described of separating alloys of gold and silver by converting the sulphate of silver into chloride of silver, then converting the chloride of silver to a metallic state by means of heat and a stream of gas, substantially as herein set forth.

3. The process herein described of separating copper from the other metals when in the ore, consisting, first, in reducing all the metals contained in the ore to a metallic state by the application of heat and gas; second, in subjecting the metals to diluted sulphuric or muriatic acid, all as herein set forth.

In testimony that I claim the foregoing as my own I affix my signature in presence of two witnesses.

DEMITRY MINDELEFF.

Witnesses:
T. H. ALEXANDER,
C. ALEXANDER.